April 28, 1970     SHOTARO YOSHIDA     3,508,811
ASPHERIC LENS HAVING LOG COS SURFACES
Filed Nov. 9, 1966     4 Sheets-Sheet 1
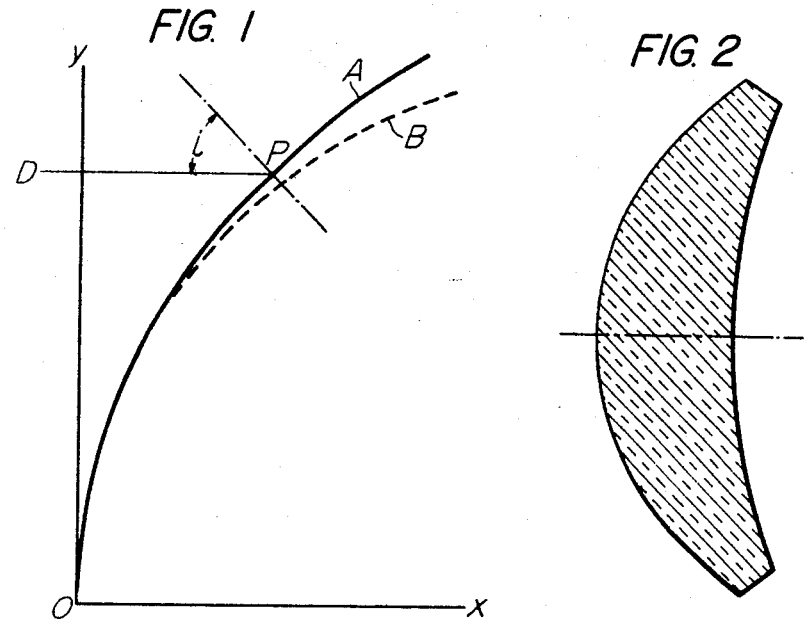
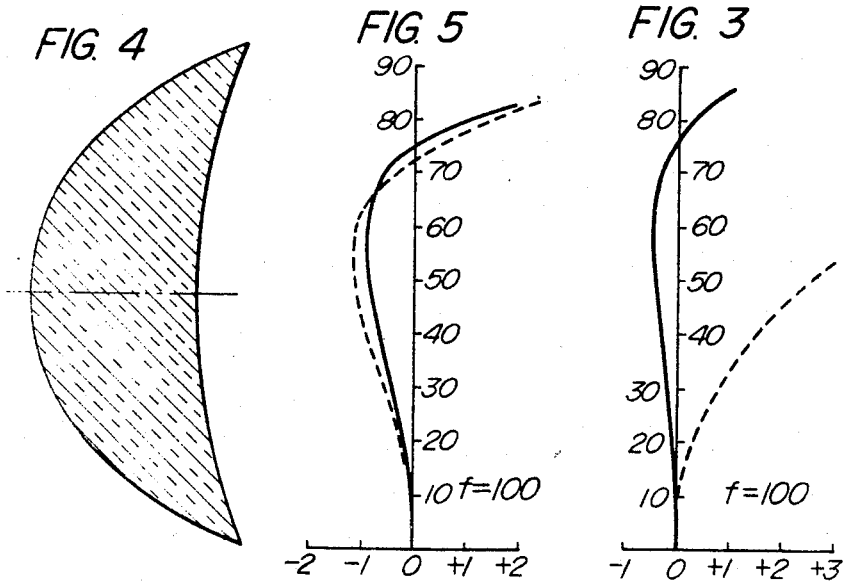
INVENTOR
Shotaro Yoshida
BY Karl W. Flocks
ATTORNEY INVENTOR
Shotaro Yoshida
BY Karl W. Flocks
ATTORNEY

# United States Patent Office 3,508,811
Patented Apr. 28, 1970

3,508,811
ASPHERIC LENS HAVING LOG COS SURFACES
Shotaro Yoshida, Sendai-shi, Japan, assignor to Taisuke Tsugami, Shinjuku-ku, Tokyo, Japan
Filed Nov. 9, 1966, Ser. No. 593,206
Claims priority, application Japan, Nov. 18, 1965, 40/70,953, 40/70,954, 40/70,955, 40/70,956, 40/70,957, 40/70,958; Apr. 5, 1966, 41/21,368, 41/21,369
Int. Cl. B29d *13/18;* G02b *3/04*
U.S. Cl. 350—189   7 Claims

ABSTRACT OF THE DISCLOSURE

An aspheric lens having a surface of revolution defined by a log cos function which reduces spherical aberration and/or coma to provide a very large effective aperture ratio, e.g. $f/0.45$ to $f/0.8$.

---

This invention relates to aspheric lenses and more particularly to a novel type of aspheric lenses having log cos surfaces.

The primary object of the present invention is to provide an aspheric lens of the kind having its lens surfaces shaped to a form which is entirely different from those of conventional ellipsoidal lenses, hyperboloidal lenses and the like for thereby reducing the spherical aberration to a minimum.

Another object of the present invention is to provide an aspheric lens having at least one of its lens surfaces made in a form which is a surface of revolution of a transcendental curve for thereby obtaining improved sine conditions and high relative apertures.

According to the present invention, there is provided an aspheric lens characterized by having one of its lens surfaces made in an aspheric form which is a surface of revolution of a log cos function selected from the group consisting of $$x = -\frac{1}{M} \cdot r \cdot \log \cos \frac{y}{r},$$

$$x = -\frac{1}{M} \cdot s \cdot \log \cos \frac{y}{t}, \text{ and}$$

$$x = -\frac{1}{M} \cdot k \cdot \log \cos (ly + my^3)$$

wherein:

$r$ is the radius of curvature at the vertex of said surface; log is the symbol representing the common logarithm; $M$ is the modulus of common logarithms and is a constant which takes the value of 0.43429448;
$s$ and $t$ are constants suitably determined for the lens; and
$k$, $l$ and $m$ are independent constants suitably determined for the specific aspheric surface, said aspheric surface being combined with another surface of suitable contour, and the refractive index of the lens material, the lens' axial thickness and the spacing between lens elements being suitably selected whereby to attain elimination of the spherical aberration and/or improvements in the sine condition.

The above and other objects, advantages and features of the present invention will become apparent from the following description with reference to the accompanying drawings, in which:

FIG. 1 is a graphic illustration of the shape of an aspheric surface employed in the aspheric lens according to the invention;

FIGS. 2, 4, 6, 8, 11, 13 and 15 are sectional views of seven preferred forms of the aspheric lens according to the invention;

FIGS. 3, 5, 7, 9, 12, 14 and 16 are graphs showing aberration curves obtained with the respective lens forms shown in FIGS. 2, 4, 6, 8, 11, 13 and 15;

Figure 6:
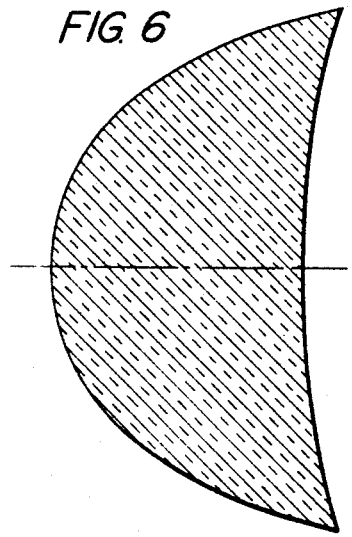

The principle and features of the aspheric lens according to the present invention will first be described with reference to FIG. 1. When a light beam hits against a spherical surface in parallel relation with the optical axis of such surface, its incident height $y$ is commonly directly proportional to the sine of an angle of incidence $i$ and, as a result, the angle of incidence $i$ makes an abrupt increase with the increase in the incident height $y$, as will be apparent from FIG. 1. The above fact is a major cause of spherical aberration encountered with a lens system consisting solely of spherical surfaces. It may be convenient therefore to employ, in lieu of the spherical surface, an aspheric surface of the kind wherein the incident height $y$ is directly proportional to the angle of incidence $i$ so as not to appreciably increase the spherical aberration even with a large degree of relative aperture.

In FIG. 1, suppose that O designates the vertex of a lens surface, OX designates the direction of the optical axis, and a line starting from point O and extending at right angles with respect to the X axis is designated as Y axis. The curve A in FIG. 1 shows a sectional contour of part of the aspheric surface employed in the aspheric lens of the invention and is expressed by the following equation:

$$X = -\frac{1}{M} \cdot r \cdot \log \cos \frac{y}{r} \quad (1)$$

where $r$ is the radius of curvature at the lens vertex, log is the symbol representing the common logarithm, and $M$ is the modulus of the common logarithms and is a constant which takes the values of 0.43429448. A surface of revolution is obtained by revolving this curve about the optical axis, or X axis, and this surface of revolution will be hereinafter referred to as a "log cos surface of the 1st kind."

The curve B shown by the dotted line in FIG. 1 is part of a circle having a radius $r$ and represents a circle of curvature passing through the vertex. As will be apparent from FIG. 1, the log cos surface of the 1st kind lies outside of the circle of curvature passing through the vertex.

Suppose now, a light beam DP parallel to the optical axis hits against the log cos surface of the 1st kind at an arbitrary point P ($x$, $y$) thereon in FIG. 1. The incident height of light beam at point P is $y$ and the angle of incidence is $i$. Then by differentiating the Equation 1 with $y$, we obtain $$\frac{dx}{dy} = \tan \frac{y}{r} \quad (2)$$

Equation 2 can be written as $$i = \frac{y}{r} \quad (3)$$

because $$\frac{dx}{dy} = \tan i$$

From the above calculation it is apparent that, in the curve represented by the Equation 1, the incident height $y$ becomes directly proportional to the angle of incidence $i$. The above principle can be utilized to facilitate the design of a lens having little spherical aberration and a large relative aperture.

In the case of a spherical surface, $$\sin i = \frac{y}{r} \quad (a)$$

holds instead of Equation 3, and in the case of a paraboloidal surface, $$\tan i = \frac{y}{r} \quad (b)$$

Thus, in contrast to $y = r \sin i$ in the spherical surface and $y = r \tan i$ in the paraboloidal surface $y = ri$ is a marked feature of the log cos surface according to the invention.

An axial spherical aberration $\Delta s'$ when a light beam running in parallel with the optical axis is refracted at the log cos surface of the 1st kind to enter an optical material with a refractive index $n$ can be expressed by the following equation:

$$\Delta s' = \frac{n^2 - 3}{6n(n-1)} \cdot \frac{y^2}{r} + \frac{22n^4 - 15n^3 - 15n^2 + 45n - 45}{360n^3(n-1)} \cdot \frac{y^4}{r^3} \quad (4)$$

Accordingly, as for those light beams falling within the so-called Seidel's region neglecting those terms including $y^4$ and above, spherical aberration equals zero at a value of $n$ of $n = \sqrt{3} = 1.73205081$. Further, the second member of Equation 4 equals zero when $n = 1.11837414$. Therefore in case of a lens having a slightly large relative aperture of the order with which the term of $y^4/r^3$ has a certain concern, reduction in the spherical aberration can well be expected when the value of $n$ is slightly smaller than 1.732.

As a useful application of the log cos surface of the 1st kind, possibility of obtaining an aplanatic lens will be described in which case reduction of the spherical aberration and satisfaction of the desired sine condition can be simultaneously attained by establishing certain specific relations between the refractive index $n$ of lens material, the radii of curvature $r$ of the lens surfaces and distance $d$ between the lens surfaces (that is, the axial thickness of the lens or the spacing between lens elements). In this kind of application, there is a feature that remarkable increase in the relative aperture is also feasible in a special case.

As a simplest case, suppose a single lens having a front surface with a radius of curvature $r_1$ at the vertex thereof, a rear surface with a radius of curvature $r_2$ at the vertex thereof, an axial thickness $d$ and a refractive index $n$ of the lens material. Suppose then that the front surface of this lens is shaped to have the log cos surface of the 1st kind represented by the Equation 1 and the rear surface thereof is shaped as a spherical surface. Considering solely those light beams falling within the Seidel's region, that is, the region in which those terms including $\theta^5$ and above are omitted from a series obtained by developing $\sin \theta$ in terms of $\theta$, the conditons in which such single lens can behave as an splanatic lens can be sought in the satisfaction of the following equations:

$$A = \frac{(n-1)^2(n-3)}{n} \quad (5)$$

$$B = -\frac{(n-1)^2(n-3)^2}{n} \quad (6)$$

$$C = \frac{(n-3)^4}{3} \quad (7)$$

$$\Sigma^3 + A\Sigma^2 + B\Sigma + C = 0 \quad (8)$$

$$r_1 = \frac{(n-1)}{n}\left(1 - \frac{\Sigma}{n-3}\right) \cdot f \quad (9)$$

$$r_2 = \frac{r_1}{\Sigma} \cdot (n^2 - 3) \quad (10)$$

$$d = \frac{3}{3-n} \cdot r_1 - r_2 \quad (11)$$

It will be understood that the values of $A$, $B$ and $C$ can be determined from Equations 5, 6 and 7 when the refractive index $n$ is given, and the value of $\Sigma$ can then be determined by solving the Equation 8, with the values or $r_1$, $r_2$ and $d$ finally obtained from the respective Equations 9, 10 and 11. Thus the shape of a single lens which has a front surface in the form of the log cos surface and a rear surface in the form of a spherical surface and is aplanatic in the Seidel's region can be definitely determined when the refractive index $n$ and the focal length $f$ are given.

The above description has referred to a single lens having its front surface made in the form of the log cos surface, but it will be readily understood that similar equations can likewise be established for achromats of cemented or separated types so that they can be made aplanatic within the Seidel's region. It is not an easy matter to analytically solve by means of algebraic expressions the spherical aberration and the sine condition when the range of light beams is further wider expanded beyond the Seidel's region, because in such a case various terms of higher order affect the spherical aberration and sine condition. However, with a single lens having a front surface in the form of the log cos surface, it is possible to design in such a way that such lens has little spherical aberration, fairly satisfies the sine condition and yet has a large relative aperture when for example the refractive index $n$ of the lens material lies within a range of from about 1.8 to 2.0. An achromat consisting of two lens elements cemented together can likewise behave as an aplanatic lens having a large relative aperture when the refractive index of the lens material, the radii of curvature of the lens surface and the lens axial thickness satisfy certain specific conditions.

Description will hereunder be given with regard to the fact that with a lens having one of its surfaces formed as the log cos surface of the 1st kind and having the other surface made in the form of an aspheric surface to completely eliminate the spherical aberration, the sine condition can be well satisfied at an extremely large relative aperture if the refractive index, the radii of curvature of the lens surfaces, the lens' axial thickness and so on are suitably selected.

It is commonly known that, when one of surfaces of a single lens is given as a flat surface, spherical surface, or known aspheric surface, the spherical aberration can be completely eliminated by making the other surface of the lens in the form of an aspheric surface. However, complete elimination of spherical aberration in this manner does not necessarily result in the satisfaction of the sine condition and is not necessarily effective to increase the relative aperture which is practically useful. For example, with a conventional ellipsoidal lens, offense against the ideal sine condition almost amounts to 1% of the focal length even if it has a relative aperture of $f/5$. Even in an aplanatic lens having an ellipsoidal front surface and an aspheric rear surface, discovered by Silberstein (J.O.S.A. vol. 11, pp. 479–494, 1925 by L. Silberstein), offense against the ideal sine condition already amounted to 1% of the focal length at a relative aperture of $f/1$.

Let us now try to completely eliminate the spherical aberration by employing, for example, a single lens having a front surface in the form of the log cos surface of the 1st kind and having a rear surface in the form of a different kind of aspheric surface. In order to completely eliminate the spherical aberration from single lens by employing an aspheric rear surface for cooperation with a front surface of known contour, the contour of the rear surface may be determined in such a manner that an optionally selected beam of light has a constant path length from an object to its image. However even with such procedure, the sine condition is not necessarily satisfied and a large relative aperture can not necessarily be obtained. The effective relative aperture and sine condition vary in a complex fashion depending on the refractive index $n$ of the lens material, the lens axial thickness $d$, and especially on the value of $r$ in Equation 1. Therefore, many trial calculations must be repeated to determine the optimum conditions.

In the trial calculations, at first the focal length $f$ of a single lens is set at 100, for example, and an actual value of refractive index $n$ is suitably determined. Then the values of the radius of curvature $(r_1)_0$ at the vertex of the front surface and the lens' axial thickness $d$ are suitably determined to determine the value of the radius of curvature $(r_2)_0$ at the vertex of the rear surface. The above determination determines all the constructional data of the single lens in its paraxial region, and thus the method as described previously can be employed to seek the since condition consistent with zero spherical aberration. The sine condition varies widely when the thickness $d$ is varied to various values with the radius of curvature $(r_1)_0$ kept constant. Among the various values of $d$, there is one which gives the most satisfactory sine condition. In like manner, a value of $d$ is obtained which gives the most satisfactory sine condition with respect to various values of the radius of curvature $(r_1)_0$. A best value of $d$ may then be selected out of the above values. A manner of calculation substantially similar to the above calculation may be employed for a case in which the log cos surface is applied to a surface other than the front surface of a lens system.

Several preferred embodiments of the present invention based on the above principle and having the features as described above will be described in detail with reference to FIGS. 2 to 16.

FIG. 2 is a sectional view of a first embodiment of the invention, and FIG. 3 is a graphic illustration of aberration characteristics of the lens of FIG. 2, with the solid curve representing the spherical aberration while the dotted curve representing the deviation from the ideal sine condition. The lens illustrated herein has its front surface made to a form of the log cos surface of the 1st kind in order to reduce the spherical aberration. The lens is made from strontium titanate disclosed by S. B. Levin, N. J. Field, F. M. Plock and L. Merker in J.O.S.A., vol. 45, pp. 737–739, September 1955 and has a relative aperture of $f/0.61$. Other constructional data of this lens are as follows:

Refractive index of lens material—$n_d=2.4076$
Radius of curvature at vertex of front surface—
  $(r_1)_0=+100.435$
Thickness—$d=51.536$
Focal length—$f=99.999962$
Distance from vertex of rear surface to focal point—
  $(s_2')_0=70.000023$ The front surface of this lens is a surface of revolution of a curve obtained by introducing $r=+100.435$ in Equation 1, while its rear surface is a spherical surface having a radius of curvature $r_2=+245.408$. It will be seen from the spherical aberration curve in FIG. 3 that, over an aperture range up to an incident height of the order of 82, the spherical aberration is held within about 0.5% of the focal length. The above embodiment apparently proves the fact that the aspheric lens of the invention employing a surface of revolution of a curve represented by the Equation 1 is quite useful in that the spherical aberration can be remarkably decreased and the relative aperture can be remarkably increased, and in that offense against the sine condition can be reduced to several percent of the previous value obtained with conventional ellipsoidal lenses or hyperboloidal lenses.

A second embodiment of the invention is a single lens with a relative aperture of $f/0.63$. This lens is made as an aplanatic lens by employing a front surface in the form of the log cos surface of the 1st kind and by establishing specific relations between the refractive index $n$ of the lens material, the radii of curvature $r$ of lens surface and the lens' axial thickness $d$. A sectional view and aberration curves of this lens are shown in FIGS. 4 and 5, respectively. Constructional data of the lens are as follows:

Refractive index of lens material—$n_d=1.933$
Radius of curvature at vertex of front surface—
  $r_1)_0=+76.700$
Thickness—$d=63.600$
Focal length—$f=99.999972$
Distance from vertex of rear surface to focal point—
  $(s_2')_0=59.976808$ The front surface of this lens is a surface of revolution of a curve obtained by introducing $r=+76.700$ in the Equation (1), while its rear surface is a spherical surface having a radius of curvature $r_2=+258.555$. It will be seen from the aberration curves that, over the entire aperture range, the spherical aberration and offense against the ideal sine condition are held within about 1.2% of the focal length.

Figure 7:
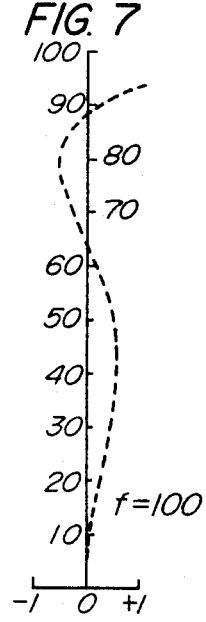

A third embodiment of the invention shown in FIG. 6 is substantially similar to the second embodiment in FIG. 4 except that the rear surface thereof is also made to a form of an aspheric surface in order to perfectly eliminate the spherical aberration and to fairly satisfy the sine condition in spite of an extremely large relative aperture. An aberration curve of the present embodiment is shown in FIG. 7. The aspheric lens proposed herein is a single lens having a relative aperture of $f/0.54$ and its constructional data are as follows:

Refractive index of lens material—$n_d=1.757$
Radius of curvature at vertex of front surface—
  $(r_1)_0=+72.500$
Thickness—$d=94.300$
Radius of curvature at vertex of rear surface—
  $(r_2)_0=+753.949$
Focal length—$f=100.000001$
Distance from vertex of rear surface to focal point—
  $(s_2')_0=43.960042$ The front surface of this lens is a surface of revolution of a curve obtained by introducing $r=+72.500$ in Equation 1, while its rear surface is an aspheric surface which is so shaped as to perfectly eliminate any spherical aberration with respect to an object disposed at an infinitely remote position on the front side of the lens. Since the spherical aberration of this lens is perfectly zero, offense against the ideal sine condition is solely shown by dotted line in FIG. 7. It will be seen that, over a range up to an incident height of about 92, offense against the ideal sine condtion is held within about 0.55% of the focal length.

For the sake of reference, some points on the front and rear surfaces of the lens of FIG. 6 as measured on the x–y rectangular coordinate system and their offenses against the ideal sine condition are tabulated in Table 1.

TABLE 1

| Front surface | | Rear surface | | Offense against sine condition |
|---|---|---|---|---|
| x | y | x | y | |
| 0.997673 | 12.000000 | 0.019484 | 5.306316 | +0.091591 |
| 4.047156 | 24.000000 | 0.090649 | 10.809793 | +0.312556 |
| 9.331336 | 36.000000 | 0.253892 | 16.766005 | +0.513977 |
| 12.913835 | 42.000000 | 0.392513 | 20.030040 | +0.546813 |
| 17.207241 | 48.000000 | 0.587945 | 23.576812 | +0.504229 |
| 22.301450 | 54.000000 | 0.861411 | 27.506695 | +0.373093 |
| 28.318040 | 60.000000 | 1.243359 | 31.959637 | +0.156012 |
| 35.424820 | 66.000000 | 1.779345 | 37.135055 | −0.119367 |
| 43.860086 | 72.000000 | 2.540515 | 43.324303 | −0.389828 |
| 53.975941 | 78.000000 | 3.642970 | 50.966267 | −0.545670 |
| 59.824286 | 81.000000 | 4.379782 | 55.532765 | −0.531664 |
| 66.321748 | 84.000000 | 5.287365 | 60.748606 | −0.423257 |
| 73.596436 | 87.000000 | 6.417696 | 66.771484 | −0.191382 |
| 81.822253 | 90.000000 | 7.843730 | 73.811891 | +0.196178 |
| 87.951106 | 92.000000 | 9.008799 | 79.209258 | +0.558288 |
| 94.706862 | 94.000000 | 10.393687 | 85.298652 | +1.016312 |
| 102.218595 | 96.000000 | 12.054984 | 92.227174 | +1.582077 |
| 107.628160 | 97.309568 | 13.328159 | 97.309568 | +2.016981 |

In the rectangular coordinate system, the direction of the optical axis is taken as the X axis and the vertexes of the front and rear surfaces are taken as origins.

As will be obvious from the three embodiments described above, optical material having a relatively high refractive index is required for the manufacture of the aspheric lens of the invention having the log cos surface of the 1st knd, but such optical glass is not so difficult to make. In single lenses the front surface of which is of a log cos surface of the first kind, and the rear surface of which is of a spherical surface as in the above-described embodiments, a good correction of aberration can be obtained when the refractive index $n$ falls within the range of from 1.6 to 3.0 when the spherical aberration only is taken into consideration. When $n$ is less than 1.6, the effective aperture ratio becomes reduced, while when $n$ is more than 3.0, it is difficult to obtain optical materials.

When both spherical aberration and coma are to be taken into consideration, the most preferred value of $n$ is in the range of from 1.8 to 2.0 as stated above. If $n$ is less than 1.8, the effective aperture ratio becomes reduced, while when $n$ is more than 2.0, the balance between the correction of the spherical aberration and the satisfaction of the sine condition is lost. It is quite easy to obtain, in accordance with commonly known practice, a lens system of achromatic character by adding an aplanatic spherical lens or lenses on the rear side of such aspheric lens.

As an application of the log cos surface, description will hereunder be given as to the fact that a log cos surface including two independent variables can give a lens system which has a large relative aperture, has little spherical aberration and yet fully satisfies the sine condition.

Suppose now that the direction of the optical axis of a single lens or a coaxial cemented lens is taken as the X axis, the vertex of one of lens surfaces is taken as the origin, and the Y axis is taken at right angles with respect to the direction of the optical axis. A surface of revolution can be obtained when a curve expressed by the following equation is revolved about the X axis (optical axis) and such surface of revolution will hereinafter be referred to as "log cos surface of the 2nd kind":

$$x = -\frac{1}{M} \cdot s \log \cos \frac{y}{t} \quad (12)$$

where log and M are symbols representing the common logarithm and the modulus of common logarithms, respectively, as described previously, and $s$ and $t$ are constants suitably determined for a specific lens.

Here, $s$ and $t$ are parameters which have the relation $$r_0 = \frac{t^2}{s}$$

between them and the radius of curvature $r_0$ of the vertex.

Acording to the results of many calculations made by the inventor, a good correction of aberration can be obtained when the ratio $s/t$ is between +0.7 and +0.3.

It is apparent that the log cos surface of the 1st kind is obtained when $s=t$ in the above equation, and explanation has already given with respect to various aspheric lenses of the previous embodiments employing the log cos surface of the 1st kind. Therefore, consideration will solely given to the case in which $s \neq t$ in the above equation. In the log cos surface of the 1st kind, the shape of such surface is specified solely by the constant $r$, but in case of an aspheric lens employing the log cos surface of the 2nd kind, there are two constants $s$ and $t$ which determine the shape of the surface and thus the degree of freedom in respect of lens design is one more than the case with the log cos surface of the 1st kind. This additional degree of freedom can be utilized for the improvement in the lens performance.

In a lens utilizing the log cos surface of the 1st kind, lens material having a considerably high refractive index has commonly been required. As a matter of fact, this means that flit glass should mainly be used as the lens material. However, by the employment of an aspheric surface in the form of the log cos surface of the 2nd kind, the newly added one freedom can be utilized to permit the use of crown glass having a lower refractive index. By the employment of the log cos surface of the 2nd kind, a fast aplanatic single lens can be designed even by use of crown glass of conventional grade such as BK7, and at the same time it is generally possible to design an aplanatic lens system having little residual aberration through free selection of glass having an arbitrary refractive index. Further, the aspheric surface obtained from Equation 12 can also be applied to any surface in a lens system instead of the foremost surface of such lens systems.

Figure 8:
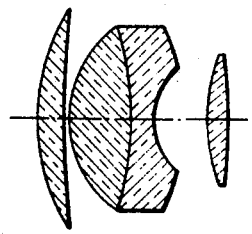

A fourth embodiment which will be described hereunder exemplifies a lens employing the log cos surface of the 2nd kind. In the fourth embodiment whose sectional view is shown in FIG. 8, the log cos surface of the 2nd kind of the present invention is applied to the third surface of a photographic objective designated DRP530843, Zeiss Ikon 1929. Constructional data of the lens shown in FIG. 8 are as follows.

$r_1 = +75.9$ $r_2 = +375.0$ $(r_3)_0 = 42.3$ $r_4 = -141.0$ $r_5 = +27.6$ $r_6 = +75.0$ $r_7 = -204.0$ $d_1 = 10.5$ $d_2 = 0.6$ $d_3 = 24.0$ $d_4 = 9.0$ $d_5 = 21.0$ $d_6 = 7.5$

| | $n_d$ | $\mu$ |
|---|---|---|
| $L_1$ | 1.6228 | 59.9 |
| $L_2$ | 1.5888 | 61.0 |
| $L_3$ | 1.7174 | 29.5 |
| $L_4$ | 1.6264 | 39.1 |

Focal length fd = 100.863337

Figure 9:
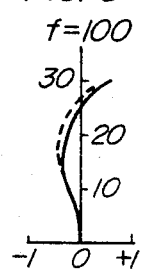

The third surface of this lens is a surface of revolution of a curve obtained by substituting $s$ and $t$ in Equation 12 by $s = +28.3039452$ and $t = +34.6014$. Other values are same as those in DRP530843. Aberration curves of the fourth embodiment of the invention are shown in FIG. 9, from which it will be seen that the spherical aberration and offense against the ideal sine condition are both held within about 0.4% of the focal length over the entire aperture up to f/1.6.

Figure 10:
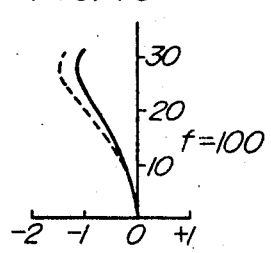
FIG. 10 is a graph showing aberration curves obtained with a conventional lens system consisting of lens elements having spherical surface contours all over in lieu of the aspheric lens system as shown in FIG. 8, the above curves being illustrated for the sake of comparison with the curves in FIG. 9.

In FIG. 10 there is shown, for the sake of comparison, aberration curves of the original DRP530843 photographic objective having all its surfaces made as spherical surfaces. From FIG. 10 it will be seen that the spherical aberration of about −1.1% and offsense against the ideal sine condition of about −1.4% are inevitable with the prior lens. It will be appreciated from the above comparison that the use of the log cos surface of the 2nd kind of the invention in such lens reduces the residual aberration to about one third of the original value.

The reason why the log cos surface was applied to the third surface in the fourth embodiment is that this surface is one in which the absolute value of the term of spherical aberration is the largest among the Seidel's aberration coefficients.

A fifth embodiment of the invention relates to an aspheric aplanatic lens of large relative aperture which comprises the combination of the log cos surface of the 2nd kind and an aspheric surface for the perfect elimination of spherical aberration and which is made from a highly light-transmissive optical material so as to give a brightest possible actual image.

Generally a large amount of radiation loss due to surface reflection and internal absorption is inevitable with glass having a high refractive index, and this tendency is more marked especially when used with light rays at short wavelengths. Due to the above fact, the amount of transmitted light, hence, the brightness of images, becomes lower for a lens of highly refractive glass than with a lens of less refractive glass even if these lenses have the same F-number. In addition to the above drawback, optical glass having a high refractive index is generally defective in its resistance to humidity, its resistance to acids, coloring, bubble inclusion and other physical as well as chemical properties and is extremely costly to make. It will be highly significant as a matter of practical use therefore to obtain an extremely excellent aplanatic lens having a comparatively large relative aperture by use of a highly light-transmissive, good-quality, inexpensive optical glass.

Figure 11:
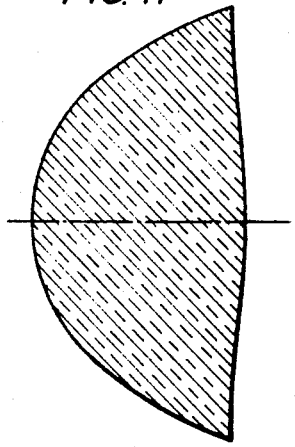

The fifth embodiment giving such aplanatic lens is shown in section in FIG. 11 and the lens has a relative aperture of f/0.68. The lens is made from a typical optical glass material, borosilicate crown BK7, which is most widely used in this field and its constructional data are as follows:

Refractive index of lens material—$n_d$=1.51633
Radius of curvature at vertex of front surface—
  $(r_1)_0$=+60.300
Thickness—$d$=80.000
Focal length—$f$=99.999979
Distance from vertex of rear surface to focal point—
  $(s_2')_0$=54.824141

The front surface of this lens is a surface of revolution of a curve obtained by introducing $s$=+79.74675 and $t$=+69.345 in Equation 12, while the rear surface thereof is an aspheric surface which is so shaped as to perfectly eliminate any spherical aberration with respect to an object disposed at an infinitely remote position ahead of the lens. For the sake of reference, some points on the front and rear surfaces of the lens of FIG. 11 as measured on the x-y rectangular coordinate system and their offenses against the ideal sine condition are tabulated in Table 2. In the rectangular coordinates system, the direction of the optical axis is taken as the X axis and the vertexes of the front and rear surfaces are taken as origins.

TABLE 2

| Front surface | | Rear surface | | Offense against sine condition |
|---|---|---|---|---|
| x | y | x | y | |
| +7.707787 | +30.000000 | −0.683418 | +17.433900 | +0.117051 |
| +14.075398 | +40.000000 | −1.212894 | +24.424384 | +0.110711 |
| +22.822236 | +50.000000 | −1.893144 | +32.729193 | +0.037941 |
| +34.542917 | +60.000000 | −2.716660 | +43.189622 | −0.050387 |
| +50.279637 | +70.000000 | −3.634630 | +57.291007 | +0.008972 |
| +72.050773 | +80.000000 | −4.443072 | +77.897743 | +0.522421 |
| +75.487255 | +81.290867 | −4.512747 | +81.290867 | +0.643307 |

Figure 12:
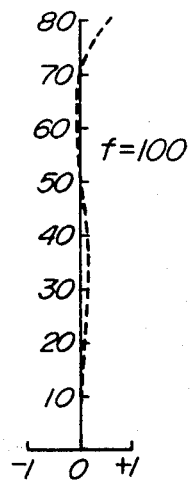

In FIG. 12 a dotted curve shows offense against the ideal sine condition, while the spherical aberration curve is not shown therein because spherical aberration is perfectly zero, from FIG. 12 it will be seen that offense against the ideal sine condition is held within about 0.12% of the focal length over a range up to an incident height of about 73.5.

The foregoing description has referred to aspheric lenses employing the log cos surfaces of the 1st and 2nd kinds. The description given hereunder relates to a lens employing a log cos surface including three independent variables.

Suppose now that the vertex of one of lens surfaces is taken as the origin, the direction of the optical axis is taken as the X axis, and Y axis is taken in a direction at right angles with respect to the optical axis. A surface of revolution is produced when a curve expressed by the following equation is revolved about the X axis, and such surface of revolution will hereinafter be referred to as "log cos surface of the 3rd kind":

$$x = -\frac{1}{M} \cdot k \cdot \log \cos (ly + my^3) \quad (13)$$

where log and M are the symbol representing the common logarithm and the modulus of common logarithms, respectively, as described previously, and $k$, $l$ and $m$ are constants suitably determined for a specific aspheric surface. Here, $k$, $l$ and $m$ are parameters having the relation $r_0 k l^2 = 1$ between them and the radius of curvature $r_0$ of the vertex. When $m=0$ in Equation 13 and $k$ and $l$ are replaced by $s$ and $l/t$, respectively, the equation will represent a curve from which the log cos surface of the 2nd kind is derived. Explanation has already been given with respect to the previous embodiments giving aspheric lenses employing the log cos surface of the 2nd kind. Therefore the later description refers to the case in which $m \neq 0$ in Equation 13.

By utilization of the log cos surface of the 3rd kind and by suitably selecting the values of the three constants $k$, $l$ and $m$, it is possible to obtain a lens having an extremely large relative aperture and minimized spherical aberration or a lens fully attaining the desired correction on the spherical aberration and sine condititon. A lens employing the log cos surface of the 3rd kind has a notable feature that spherical aberration can be perfectly corrected at three annular zones if these constants are suitably selected.

Figure 13:
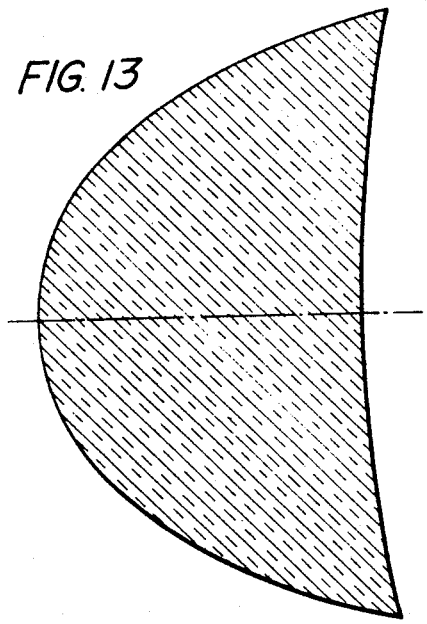
Figure 14:
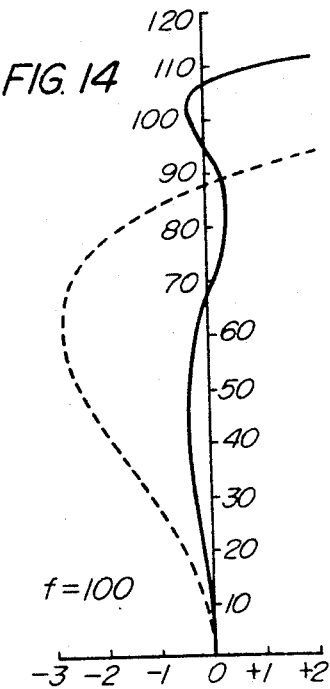

A sixth embodiment according to the invention is an aspheric lens having a relative aperture of f/0.46. FIGS. 13 and 14 are a sectional view and aberration curves of the present embodiment, respectively. Constructional data of this aspheric lens are as follows:

Refractive index of lens material—$n_d$=1.80518
Radius of curvature at vertex of front surface—$(r_1)_0$=
  +76.988607
Thickness—$d$=124.000
Focal length—$f$=99.999997
Distance from vertex of rear surface to focal point—
  $(s_2')_0$=28.159773

The front surface of this lens is a surface of revolution of a curve obtained by introducing $k$=+132.059715, $l$=+0.0099174859 and $m$=+0.00000005414456 in Equation 13, while the rear surface thereof is a spherical surface having a radius of curvature $r_2=+494.594$.

For the sake of reference, rectangular coordinates of some points on the front surface of the lens and spherical aberration thereof together with deviation from the ideal sine condition are tabulated in Table 3.

TABLE 3

| Front surface | | Spherical aberration | Offense against sine condition |
|---|---|---|---|
| x | y | $s_2'-(s_2')_0$ | |
| 2.626513 | 20.000000 | −0.157082 | −0.550787 |
| 5.992708 | 30.000000 | −0.294481 | −1.152767 |
| 10.868342 | 40.000000 | −0.388810 | −1.836022 |
| 17.436157 | 50.000000 | −0.371073 | −2.445305 |
| 25.964617 | 60.000000 | −0.200290 | −2.781699 |
| 36.845235 | 70.000000 | +0.090917 | −2.594182 |
| 50.658620 | 80.000000 | +0.340578 | −1.553488 |
| 68.300003 | 90.000000 | +0.243771 | +0.801515 |
| 78.980528 | 95.000000 | −0.003778 | +2.668523 |
| 91.238914 | 100.000000 | −0.280108 | +5.121682 |
| 102.426579 | 104.000000 | −0.276803 | +7.564339 |
| 111.786525 | 107.000000 | +0.126127 | +9.692220 |
| 125.831872 | 111.000000 | +1.788537 | +12.915082 |
| 137.789017 | 114.000000 | +4.465853 | +15.598549 |

As will be apparent from FIG. 14 and Table 3, spherical aberration is quite satisfactorily corrected and is held within about 0.4% of the focal length over an aperture range up to an incident height of about 108. This aspheric lens has an especially notable feature that zero spherical aberration can be obtained at three annular zones at incident heights of about 67, 95 and 106.5.

A seventh embodiment of the present invention relates to an aspheric lens in which the log cos surface of the 3rd kind is combined with the another surface of aspheric contour in order to perfectly eliminate the spherical aberration in spite of a large relative aperture and in which the values of $k$, $l$ and $m$ determining the shape of the log cos surface of the 3rd kind are suitably combined to attain the best satisfaction of the sine condition. Actually, this aspheric lens has a relative aperture of $f/0.54$.

Figure 15:
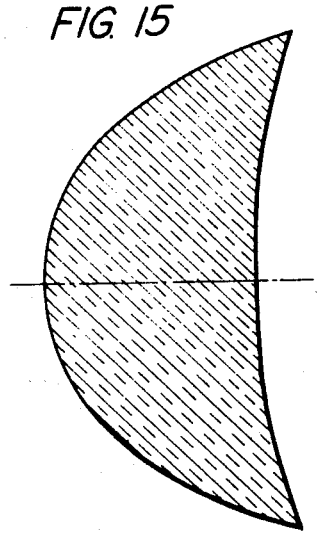
Figure 16:
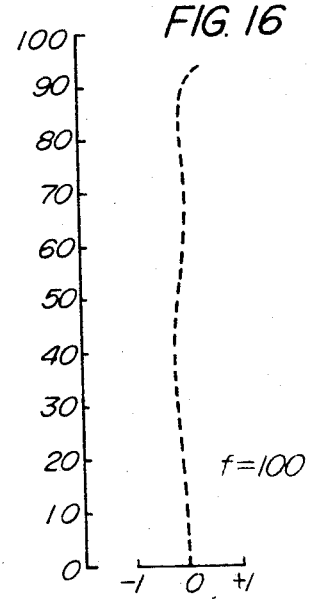

In FIGURES 15 and 16, there are shown a sectional view of such lens and a graphic illustration of offense against the ideal sine condition, respectively. From FIG. 16, it will be seen that the offense against the ideal sine condition is held within 0.2% over the entire aperture range and especially within 0.05% in an incident height range from about 57 to 91 in spite of the fact that the lens has such a large relative aperture. This lens also has a notable feature that the sine condition is perfectly satisfied at three annular zones at incident heights of about 64.5, 76 and 89.5. The present lens has the constructional data which are as follows:

Refractive index of lens material—$n_d$=1.80518
Radius of curvature at vertex of front surface—$(r_1)_0$ +73.289
Thickness—$d$=79.500
Radius of curvature at vertex of rear surface—$(r_2)_0$= +421.345
Focal length—$f$=99.99998
Distance from vertex of rear surface to focal point— $(s_2')_0$=51.616107

The front surface of this lens is a surface of revolution of a curve obtained by introducing $k=+51.085583$, $l=+0.0163429866$ and $m=0.0000001389265$ in Equation 13, while the rear surface thereof is an aspheric surface which is so shaped as to perfectly eliminate the spherical aberration with respect to an object disposed at an infinitely remote position on the front side of the lens.

For the sake of reference, some points on the front and rear surfaces of the lens in FIG. 15 as measured on the $x$-$y$ rectangular coordinate system and their offenses against the ideal sine condition are tabulated in Table 4. According to the results of many calculations, a good result can be obtained when $0.7<kl<3.0$. Also, assuming the focal length of the lens to be 100, a good correction of aberration can be obtained when the absolute value of $m$ is less than $1\times10^{-8}$. However, the discussion of the case of $m=0$ is not repeated here because this case coincides with the case of the aforementioned log cos surface of the second kind.

| Front surface | | Rear surface | | Offense against sine condition |
|---|---|---|---|---|
| x | y | x | y | |
| 0.684123 | 10.000000 | +0.032010 | 5.185800 | +0.026781 |
| 2.759736 | 20.000000 | +0.132910 | 10.519006 | −0.001649 |
| 6.301267 | 30.000000 | +0.319476 | 16.159621 | −0.155280 |
| 8.662624 | 35.000000 | +0.454948 | 19.153058 | −0.172212 |
| 11.450341 | 40.000000 | +0.627307 | 22.299400 | −0.173484 |
| 14.698228 | 45.000000 | +0.846307 | 25.633589 | −0.157144 |
| 18.450472 | 50.000000 | +1.125536 | 29.199248 | −0.124553 |
| 22.765264 | 55.000000 | +1.484034 | 33.052807 | −0.080578 |
| 27.720502 | 60.000000 | +1.948855 | 37.270151 | −0.033847 |
| 33.422676 | 65.000000 | +2.559309 | 41.957156 | +0.004062 |
| 40.021629 | 70.000000 | +3.374356 | 47.267100 | +0.020805 |
| 47.736254 | 75.000000 | +4.485879 | 53.431195 | +0.007749 |
| 56.902875 | 80.000000 | +6.043886 | 60.814418 | −0.030445 |
| 68.074622 | 85.000000 | +8.308802 | 70.028217 | −0.058962 |
| 82.257384 | 90.000000 | +11.771930 | 82.186099 | +0.018931 |
| 93.006301 | 93.000000 | +14.818083 | 91.761343 | +0.199293 |
| 94.885779 | 93.465767 | +15.385778 | 93.465767 | +0.242140 |

It will be understood that the lens employing the log cos surface of the 3rd kind can well satisfy the aplanatism in spite of such a large relative aperture, and it is further possible to visualize an aplanatic lens with a further larger relative aperture by suitable selection of the constants $k$, $l$ and $m$ in Equation 13.

Figure 17:
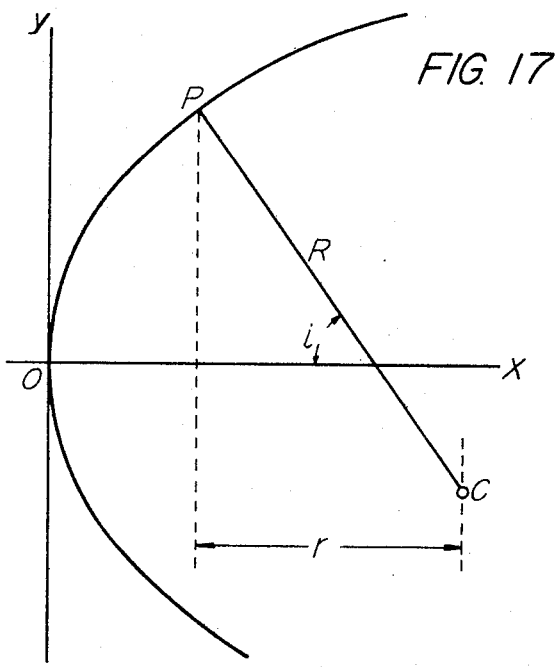
FIG. 17 is also a graphic illustration of the aspheric surface for the explanation of its important property.

In addition to the various notable features of the present invention, the log cos surface of the 1st kind has another important property. Suppose now in FIG. 17, PC designates a normal drawn at an arbitrary point P on the log cos curve and C designates the center of curvature of the curve at point P. Then the radius of curvature R and the rectangular coordinates $\alpha$ and $\beta$ of the center of curvature C can be expressed by the following equations:

$$R = r \cdot \sec i \quad (14)$$
$$\alpha = x + r \quad (15)$$
$$\beta = y - r \cdot \tan i \quad (16)$$

where $i$ is an angle defined between the X axis and PC. As will be apparent from the above Equations 14 and 15, the length of the radius of curvature PC, as it is projected on the X axis is exactly equal to $r$. This relation is the second important property of the log cos surface of the 1st kind.

The above described geometrical properties of the log cos surface of the 1st kind can be advantageously utilized for obtaining a lens grinding machine adapted for grinding and polishing such aspheric surfaces.

Figure 18:
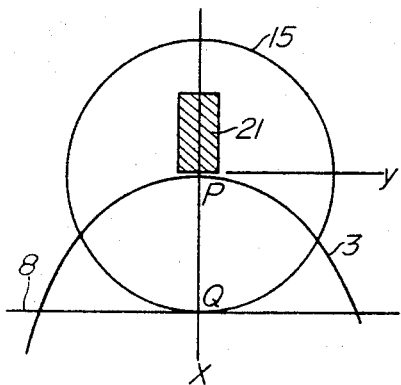
FIGS. 18 and 19 are schematic illustrations of the principle of a lens grinding machine preferably used for the grinding and polishing of the aspheric lens of the invention.
Figure 19:
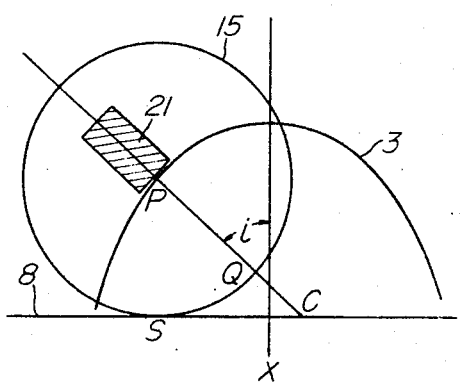

FIGS. 18 and 19 show the principle of grinding the aspheric surface with such lens grinding machine. In FIG. 18, the log cos curve represented by Equation 14 is designated by numeral 3, and a circle 15 having a radius $r$ is drawn about a point P, while a grinder segment 21 is disposed in such a manner that the central portion of its lower face is in horizontally tangential relation with respect to the center P of the circle 15.

FIG. 19 shows a state in which the circle 15 rolls over a straight line 8 through an angle $i$ without making any sliding movement thereon. When under this state the curve 3 is moved upwardly on the X axis, the curve 3 ceases its movement at a position at which the central portion of the lower face of the grinder segment 21 is exactly brought into tangential contact with the curve 3 at the point P. This is because the distance SQ over which the circle 15 rolls is equal to $ir=y$ as apparent from Equation 3. Further, under this state, $PC=r \sec i=R$, hence the center of curvature C is positioned on the straight line 8.

The aspheric surface according to the invention can be applied not only to a front or rear surface of a single lens but also to one of the surfaces of a lens system comprising a coaxial combination of a plurality of lenses, with some other surface of such system made also in a form of an aspheric surface, so as to effect desired correction of the spherical aberration and/or the sine condition. Moreover, an achromatic lens system including a single lens employing the inventive aspheric surface which is followed by a spherical lens or lenses in coaxial relation with respect thereto can be easily practised in accordance with a method commonly known in the art.

The aspheric lens according to the invention is quite useful as condensers, projection lenses, fast photographic lenses, microscope objectives, telescope objectives, and the like, or as constituent parts thereof, and is also extremely advantageously used for incorporation in an ordinary lens system because it provides a lens system having a least possible number of component lenses and minimized aberrations.

What is claimed is:

1. An aspheric lens comprising a front surface formed into a surface of revolution defined—when the vertex of said lens is taken as the origin, the optical axis is taken as the X-axis, and a line perpendicular to the optical axis or the incidence height is taken as the y-axis—by the curve $$x = -\frac{1}{M} \cdot r_1 \cdot \log \cos \frac{y}{r_1}$$

where $r_1$ is the radius of curvature of said vertex, and $M$ is the modulus of common logarithm, 0.43429448; and a rear surface having the radius of curvature $r_2$ of about 258, said radius of curvature $r_1$, the refractive index $n$ of said lens and the thickness $d$ of said lens being about 77, 1.9 and 64, respectively.

2. An aspheric lens comprising a front surface formed into a surface of revolution defined—when the vertex of said lens is taken as the origin, the optical axis is taken as the x-axis, and a line perpendicular to the optical axis or the incidence height is taken as the y-axis—by the curve $$x = -\frac{1}{M} \cdot r_1 \cdot \log \cos \frac{y}{r_1}$$

where $r_1$ is the radius of curvature of said vertex, and $M$ is the modulus of common logarithm, 0.43429448; and a rear surface having the radius of curvature $r_2$ having a value of about $+245$, said radius of curvature $r_1$, the refractive index $n$ of said lens and the thickness $d$ of said lens being, respectively, about 100, 2.4 and 51.5.

3. An aspheric lens comprising a front surface formed into a surface of revolution defined—when the vertex of said lens is taken as the origin, the optical axis is taken as the x-axis, and a line perpendicular to the optical axis or the incidence height is taken as the y-axis—by the curve $$x = -\frac{1}{M} \cdot r_1 \cdot \log \cos \frac{y}{r_1}$$

where $r_1$ is the radius of curvature of said vertex, and $M$ is the modulus of common logarithm, 0.43429448; and a rear surface formed into a surface of revolution of the curve given by the following table in rectangular coordinates

| x | y | x | y |
|---|---|---|---|
| 0.019484 | 5.306316 | 3.642970 | 50.966267 |
| 0.090649 | 10.809793 | 4.379782 | 55.532765 |
| 0.253892 | 16.766005 | 5.287365 | 60.748606 |
| 0.392513 | 20.030040 | 6.417696 | 66.771484 |
| 0.587945 | 23.576812 | 7.843730 | 73.811891 |
| 0.861411 | 27.506695 | 9.008799 | 79.209258 |
| 1.243359 | 31.959637 | 10.393687 | 85.298652 |
| 1.779345 | 37.135055 | 12.054984 | 92.227174 |
| 2.540515 | 43.324303 | 13.328159 | 97.309568 | the refractive index $n$ of the material of said lens, said radius of curvature $r_1$, the radius of curvature $(r_2)_0$ of the vertex of said rear surface, and the thickness $d$ of said lens respectively being about 1.76, 72.5, 754 and 94

4. An aspheric lens comprising a front surface formed into a surface of revolution defined by the curve $$x = -\frac{1}{M} \cdot s \cdot \log \cos \frac{y}{t}$$

where $s$ and $t$ are parameters, and a rear surface formed into a surface of revolution of the curve given by the table

| x | y |
|---|---|
| −0.683418 | +17.433900 |
| −1.212894 | +24.424384 |
| −1.893144 | +32.729193 |
| −2.716660 | +43.189622 |
| −3.634630 | +57.291007 |
| −4.443072 | +77.897743 |
| −4.512747 | +81.290867 | in rectangular coordinates, the refractive index $n$ of said lens, the radius of curvature $(r_1)_0$ of the vertex of said front surface, said parameters $s$ and $t$, and the thickness $d$ of said lens being, respectively, about 1.5, 60, 80, 69, and 80.

5. An aspherical achromatic lens system comprising a single front lens $L_1$, a composite intermediate lens $L_2$ and $L_3$, and a single rear lens $L_4$, the radii of curvature $r_1$, $r_2$, $(r_3)_0$, $r_4$, $r_5$, $r_6$ and $r_7$ of surfaces of said lenses from the front surface of said front lens to the rear surface of said rear lens, the distances $d_1$, $d_2$, $d_3$, $d_4$, $d_5$ and $d_6$ between said surfaces, and the refractive indices $n_d$ and Abbe numbers $\nu$ of said lenses being given by $r_1 = +75.9$    $d_1 = 10.5$
$r_2 = +375.0$    $d_2 = 0.6$
$(r_3)_0 = +42.3$    $d_3 = 24.0$
$r_4 = -141.0$    $d_4 = 9.0$
$r_5 = +27.6$    $d_5 = 21.0$
$r_6 = +75.0$    $d_6 = 7.5$
$r_7 = -204.0$

| | $n_d$ | $\nu$ |
|---|---|---|
| $L_1$ | 1.6228 | 59.9 |
| $L_2$ | 1.5888 | 61.0 |
| $L_3$ | 1.7174 | 29.5 |
| $L_4$ | 1.6264 | 39.1 | the third surface being a surface of revolution defined by the curve $$x = -\frac{1}{M} \cdot s \cdot \log \cos \frac{y}{t}$$

wherein $s$ is about 28 and $t$ is about 34.

6. An aspheric lens comprising a front surface formed into a surface of revolution defined by the curve $$x = -\frac{1}{M} \cdot k \cdot \log \cos (ly + my^3)$$

where $k$, $l$ and $m$ are parameters, and a spherical rear surface, the refractive index $n$, the radius of curvature $(r_1)_0$ of the vertex of said front surface, said parameters $k$, $l$ and $m$, the radius of curvature $r_2$ of said rear surface, and the thickness $d$ of said lens being, respectively, about 1.8, 77, 132, 0.0099, 0.000000054, 495 and 124.

7. An aspheric lens comprising a front surface formed into a susface of revolution defined by the curve $$x = -\frac{1}{M} \cdot k \cdot \log \cos (ly + my^3)$$

where $k$, $l$ and $m$ are parameters, and a rear surface formed into a surface of revolution of the curve given by the table

| Number: | $x$ | $y$ |
|---|---|---|
| 1 | 0.032010 | 5.185800 |
| 2 | 0.132910 | 10.519006 |
| 3 | 0.319476 | 16.159621 |
| 4 | 0.454948 | 19.153058 |
| 5 | 0.627307 | 22.299400 |
| 6 | 0.846307 | 25.633589 |
| 7 | 1.125536 | 29.199248 |
| 8 | 1.484034 | 33.052807 |
| 9 | 1.948855 | 37.270151 |
| 10 | 2.559309 | 41.957156 |
| 11 | 3.374356 | 47.267100 |
| 12 | 4.485879 | 53.431195 |
| 13 | 6.043886 | 60.814418 |
| 14 | 8.308802 | 70.028217 |
| 15 | 11.771930 | 82.186099 |
| 16 | 14.818083 | 91.761343 |
| 17 | 15.385778 | 93.465767 | in rectangular coordinates, the refractive index $n$, the radius of curvature $(r_1)_0$ of the vertex of said front surface, said parameters $k$, $l$ and $m$, the radius of curvature $(r_2)_0$ of the vertex of said rear surface, and the thickness $d$ of said lens being, respectively, about 1.8, 73, 51, +0.016, $-0.14 \times 10^{-6}$, 420 and 80.

References Cited

UNITED STATES PATENTS

| | | | |
|---|---|---|---|
| 2,388,119 | 10/1945 | Burch | 350—189 |
| 2,637,242 | 5/1953 | Osterberg et al. | 350—189 |
| 2,730,925 | 1/1956 | Kavanagh | 350—189 |
| 2,777,364 | 1/1957 | Murray | 350—189 |
| 3,014,407 | 12/1961 | Altmann | 350—189 |

PAUL R. GILLIAM, Primary Examiner

U.S. Cl. X.R.

350—181, 185